C. H. DANA.
Cultivator.
No. 11,361.
Patented July 25, 1854.
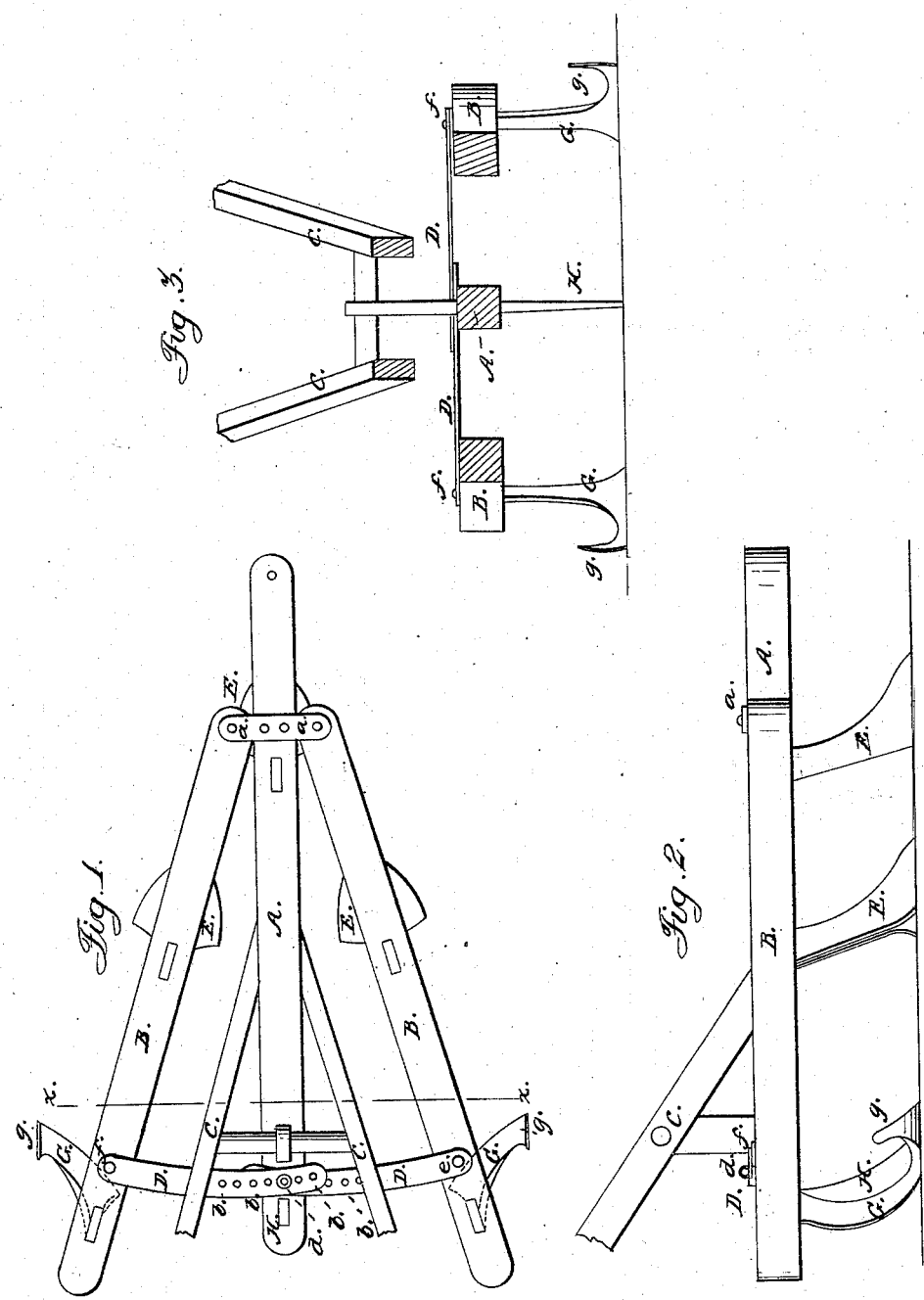

UNITED STATES PATENT OFFICE.

CHARLES H. DANA, OF WEST LEBANON, NEW HAMPSHIRE.

IMPROVEMENT IN CULTIVATORS.

Specification forming part of Letters Patent No. 11,361, dated July 25, 1854.

*To all whom it may concern:*

Be it known that I, CHARLES H. DANA, of West Lebanon, in the county of Grafton and State of New Hampshire, have invented a new and Improved Weeding-Cultivator; and I do hereby declare that the following is a full and exact description thereof, reference being had to the accompanying drawings, making part of this specification—

Figure 1 being a plan of my improved cultivator; Fig. 2, a side elevation thereof, and Fig. 3 a transverse vertical section of the same in the line $x\ x$ of Fig. 1.

Like letters designate corresponding parts in all the figures.

The nature of my invention consists, first, in constructing each of the two outermost teeth, G, with a horizontal blade projecting more or less outwardly from its shank, and with an upright portion, $g$, bent up at the extremity of said outwardly-projecting blade, the edge of said upright portion being parallel, or thereabout, with the longitudinal direction of the cultivator for the purpose of cutting up the weeds close to rows of corn or other plants, and at the same time drawing the weeds away from the rows, and also serving to guide the attendant in directing the cultivator, so as not to injure the plants by too near an approach to them, substantially as hereinafter specified; second, in employing, in combination with the above, a rudder or guiding-blade, H, constructed and operating as hereinafter set forth, in order to enable the cultivator to move steadily and not be suddenly thrown sidewise by impediments, so that it can be directed very near the plants without danger of destroying or injuring them.

The cultivator may be constructed in any suitable and convenient manner before adding my said improvements.

In the drawings, A represents a central longitudinal beam, with two side beams, B B, hinged at $a\ a$ thereto in any suitable manner, and also connected therewith, near their rear or vibrating ends, by means of bars D D, hinged at $f\ f$, respectively, to said side-beams, and provided with series of holes $b\ b$, through which a pin, $d$, passes, as well as into the central beam, by which arrangement or its equivalent the cultivator may be laterally expanded or contracted to suit different distances between rows of plants. C C (represented broken off in the drawings) are the handles, secured to the central beam, A, for directing the cultivator. All of the teeth E E except the two outermost ones, G G, may be constructed and arranged as usual. The two weeding-teeth G G are intended for cutting up the weeds close to the rows of plants, and for this purpose are constructed in the following manner: Each one has a comparatively long, narrow, and thin blade lying horizontally, which projects somewhat forward and outwardly to a considerable extent, so that it will skim just beneath the surface of the ground, thereby cutting up the weeds and tending to draw them inward rather than outward. Said blade may also project inward from its shank as far as desirable. At its outer extremity the blade turns up at right angles, or thereabout, and forms a thin upright portion, $g$, situated parallel, or nearly so, with the longitudinal direction of the cultivator, and of such a height that it can be seen above the ground when the cultivator is operating. The use of this upright portion of the blade is, first, to cut and separate the earth and weeds vertically close to the plants without disturbing them; secondly, to prevent any earth or weeds cut up by the blade from being thrown or driven outward upon the plants, which otherwise would certainly take place; thirdly, to serve as a guide to the attendant, whereby he can accurately direct the teeth very close to the plants without danger of destroying or injuring them.

The rudder or guiding-blade H is secured to the hind end of the central beam, A, in the same manner as one of the teeth. It consists simply of a thin piece of metal, or any suitable material, extending vertically to about the same depth as the teeth of the cultivator, its edge being situated in the longitudinal direction of the cultivator, as represented in Fig. 3, while its lateral profile resembles somewhat that of an ordinary cultivator-tooth, as shown in Fig. 2. Its object and action is to cut the earth edgewise, as a rudder cuts the water, and thereby to keep the motion of the cultivator in a direct forward line, whereby the cultivator is made to move steadily without swerving or being suddenly thrown sidewise by any impediments, such as stones, sods, &c.

It may be secured to any other part of the cultivator, near the lateral range of the weeding-teeth, and more than one rudder may be used, if desirable; and I contemplate, if it should be convenient, making a vertical blade project downward from the bottom of one or both of the weeding-teeth to serve as the rudder or a substitute thereof.

What I claim as my invention, and desire to secure by Letters Patent, is—

Constructing each of the two outermost teeth, G, with a horizontal blade projecting more or less outwardly from its shank, and with an upright portion, $g$, bent up at the extremity of said outwardly-projecting blade, the edge of said upright portion being parallel, or thereabout, with the longitudinal direction of the cultivator for the purpose of cutting up the weeds close to the rows of corn or other plants, and at the same time drawing the weeds away from the rows, and also serving to guide the attendant in directing the cultivator, so as not to injure the plants by too near an approach to them, substantially as herein described.

The above specification of my improved weeding-cultivator signed and witnessed this 17th day of April, 1854.

CHAS. H. DANA.

Witnesses:
HORACE FOSTER,
S. W. DANA.